(12) United States Patent
Kawai et al.

(10) Patent No.: US 9,529,315 B1
(45) Date of Patent: Dec. 27, 2016

(54) DRIVING-FORCE TRANSMITTING DEVICE AND IMAGE FORMING APPARATUS

(71) Applicant: FUJI XEROX CO., LTD., Tokyo (JP)

(72) Inventors: Jun Kawai, Kanagawa (JP); Takayuki Kondo, Kanagawa (JP); Zentaro Nemoto, Kanagawa (JP); Masami Sakurai, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/014,129

(22) Filed: Feb. 3, 2016

(30) Foreign Application Priority Data

Aug. 12, 2015 (JP) ................................ 2015-159555

(51) Int. Cl.
  *G03G 15/00* (2006.01)
  *F16D 1/02* (2006.01)
  *F16D 1/10* (2006.01)

(52) U.S. Cl.
  CPC ............... *G03G 15/757* (2013.01); *F16D 1/02* (2013.01); *F16D 1/10* (2013.01); *F16D 2001/103* (2013.01)

(58) Field of Classification Search
  CPC  G03G 15/757; G03G 15/751; G03G 15/5008; G03G 2221/1657; F16H 1/20; F16H 1/02; F16H 1/10; F16H 2001/103
  USPC .................................................. 399/167, 159
  See application file for complete search history.

(56) References Cited

U.S. PATENT DOCUMENTS

| | | | | |
|---|---|---|---|---|
| 6,671,475 B2* | 12/2003 | Katada | ................. | G03G 15/757 399/167 X |
| 6,968,144 B2* | 11/2005 | Mizoguchi | ........... | G03G 15/757 399/167 |
| 2002/0085858 A1* | 7/2002 | Yamaguchi | .......... | G03G 15/757 399/167 |
| 2002/0172531 A1* | 11/2002 | Harada | ................ | G03G 15/757 399/167 |
| 2007/0003321 A1* | 1/2007 | Hara | .................... | G03G 15/757 399/167 |
| 2014/0356027 A1* | 12/2014 | Yamazaki | ................. | F16H 1/20 399/167 |
| 2015/0053032 A1* | 2/2015 | Yamazaki | ............ | G03G 15/757 74/412 R |

FOREIGN PATENT DOCUMENTS

| | | |
|---|---|---|
| JP | 2009-223247 A | 10/2009 |
| JP | 2012-233488 A | 11/2012 |
| JP | 2014-044276 A | 3/2014 |

\* cited by examiner

*Primary Examiner* — Sophia S Chen
(74) *Attorney, Agent, or Firm* — Sughrue Mion, PLLC

(57) ABSTRACT

A driving-force transmitting device includes a driving-side joint portion that couples to a receiving-side joint portion provided at an end of a rotatable body and transmits a rotational driving force of a driving source. The driving-side joint portion and the receiving-side joint portion are a pair of involute spline joints including an external gear and an internal gear, a number of teeth of one of the gears being smaller than a number of teeth of the other gear.

9 Claims, 9 Drawing Sheets

FIG. 9

| EXTERNAL GEAR | NUMBER OF TEETH | MODULE | MATERIAL | YOUNG'S MODULUS Mpa | TORSIONAL RIGIDITY N·m/rad |
|---|---|---|---|---|---|
| 123 | 18 | | | | 54.4 |
| 123a | 9 | 0.8 | POM | 3000 | 42.1 |
| 123b | 6 | | | | 36.4 |

DRIVING-FORCE TRANSMITTING DEVICE AND IMAGE FORMING APPARATUS

CROSS-REFERENCE TO RELATED APPLICATIONS

This application is based on and claims priority under 35 USC 119 from Japanese Patent Application No. 2015-159555 filed Aug. 12, 2015.

BACKGROUND

Technical Field

The present invention relates to a driving-force transmitting device and an image forming apparatus.

SUMMARY

According to an aspect of the invention, there is provided a driving-force transmitting device including a driving-side joint portion that couples to a receiving-side joint portion provided at an end of a rotatable body and transmits a rotational driving force of a driving source. The driving-side joint portion and the receiving-side joint portion are a pair of involute spline joints including an external gear and an internal gear, a number of teeth of one of the gears being smaller than a number of teeth of the other gear.

BRIEF DESCRIPTION OF THE DRAWINGS

An exemplary embodiment of the present invention will be described in detail based on the following figure, wherein:

FIG. 9 is a table showing the torsional rigidities of the external gears having different numbers of teeth.

DETAILED DESCRIPTION

Figure 1:
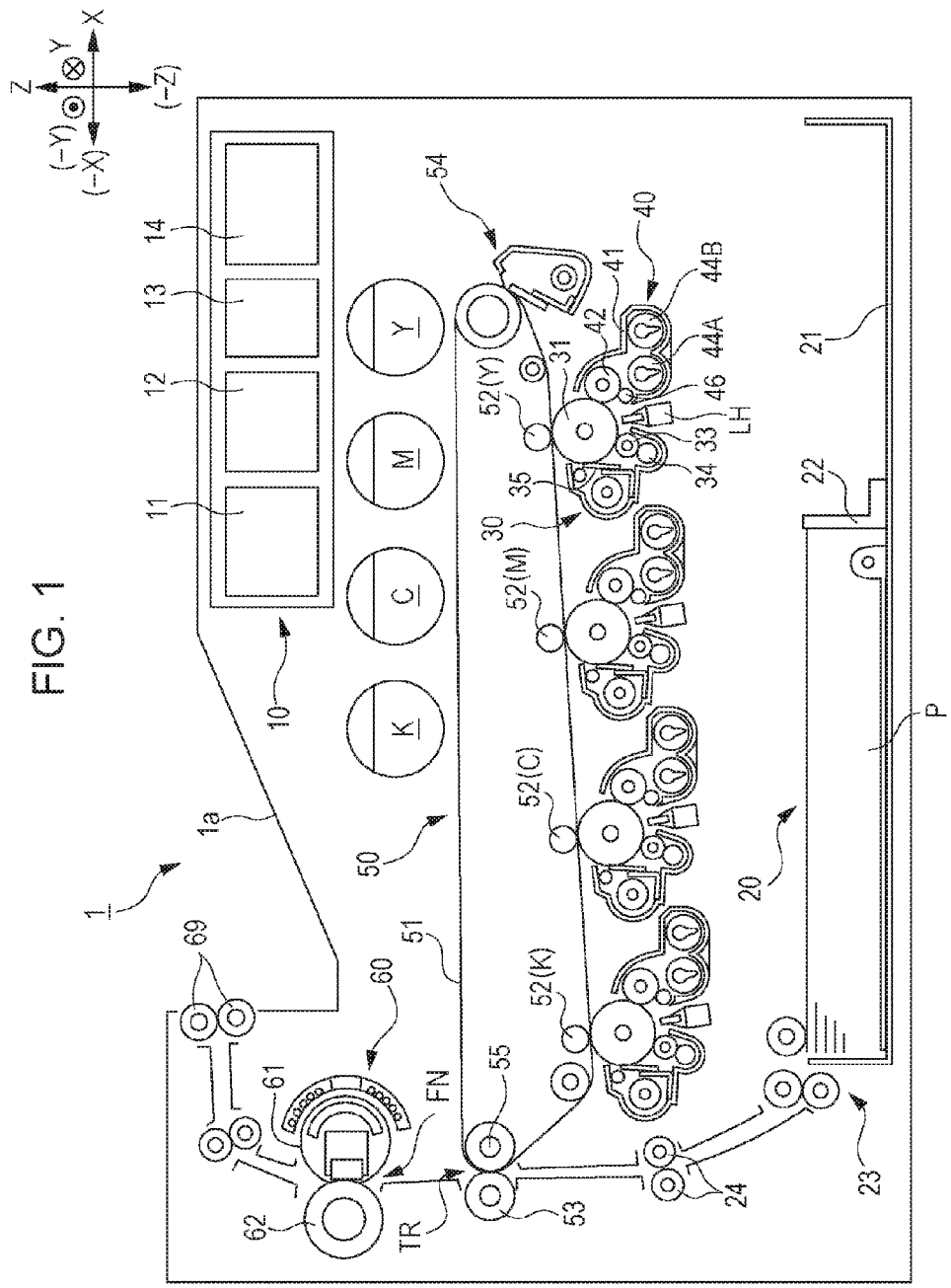
FIG. 1 is a schematic sectional view illustrating the internal structure of an image forming apparatus.

The present invention will be explained in further detail by describing an exemplary embodiment and examples with reference to the drawings. However, the present invention is not limited to the exemplary embodiment and examples.

It is to be noted that the drawings referred to in the following description are schematic, and that dimensional ratios, for example, are not equal to the actual dimensional ratios. Components other than those needed to be explained to facilitate understanding are omitted as appropriate in the drawings.

To facilitate understanding of the following description, in the drawings, the front-rear direction is defined as the X-axis direction, the left-right direction is defined as the Y-axis direction, and the up-down direction is defined as the Z-axis direction.

1. Overall Structure and Operation of Image Forming Apparatus

FIG. 1 is a schematic sectional view illustrating the internal structure of an image forming apparatus 1 including a driving-force transmitting device 100 according to an exemplary embodiment.

The overall structure and operation of the image forming apparatus 1 will be described with reference to FIG. 1.

The image forming apparatus 1 includes a control device 10, a sheet feeding device 20, photoconductor units 30, developing devices 40, a transfer device 50, and a fixing device 60. An output tray 1a, which receives sheets having images recorded thereon, is provided on the top surface (Z-direction-side surface) of the image forming apparatus 1.

The control device 10 includes an image-forming-apparatus controller 11 that controls the operation of the image forming apparatus 1; a controller unit 12 that prepares image data corresponding to a print request; an exposure controller 13 that controls the on-off state of exposure devices LH; and a power supply device 14. The power supply device 14 applies a high voltage to, for example, charging rollers 33, developing rollers 42, first transfer rollers 52(K), 52(C), 52(M), and 52(Y), and a second transfer roller 53, which will be described below, and supplies electric power to, for example, the exposure devices LH, the sheet feeding device 20, the fixing device 60, and various sensors.

The controller unit 12 converts print information input thereto from an external information transmission device (for example, a personal computer) into image information used to form a latent image, and outputs drive signals to the exposure devices LH at a preset timing. Each of the exposure devices LH according to the present exemplary embodiment includes an LED head in which plural light emitting diodes (LEDs) are linearly arranged in a scanning direction.

The sheet feeding device 20 is provided in a lower section of the image forming apparatus 1. The sheet feeding device 20 includes a sheet stacking plate 21, and multiple sheets P, which serve as recording media, are stacked on the top surface of the sheet stacking plate 21. The sheets P stacked on the sheet stacking plate 21 are positioned in the width direction by a restricting plate 22. The sheets P are drawn one at a time from the top toward the front side (in the –X direction) by a sheet-drawing unit 23, and then are transported to a nip portion of a pair of registration rollers 24.

The photoconductor units 30 are arranged next to each other above (on the Z-direction side of) the sheet feeding device 20. Each photoconductor unit 30 includes a rotatable photoconductor drum 31. A charging roller 33, an exposure device LH, a developing device 40, a first transfer roller 52(K), 52(C), 52(M), and 52(Y), and a cleaning blade 35 are arranged around the photoconductor drum 31 in that order in the rotation direction of the photoconductor drum 31. A cleaning roller 34, which cleans the surface of the charging roller 33, is arranged so as to face the charging roller 33 and be in contact with the charging roller 33.

The developing device 40 includes a developing housing 41 that contains developer. The developing housing 41 houses a developing roller 42, which serves as a developer carrier and which is arranged so as to face the photoconductor drum 31, and a pair of transport augers 44A and 44B that are disposed behind and below the developing roller 42 and that stir and transport the developer toward the developing roller 42. A layer-thickness regulating member 46, which regulates the layer thickness of the developer, is disposed near the developing roller 42.

Developing devices 40 having substantially the same structure except for the color of the developer contained in the developing housing 41 are provided to form yellow (Y), magenta (M), cyan (C), and black (K) toner images.

The surface of each photoconductor drum 31 that rotates is charged by the charging roller 33, and an electrostatic latent image is formed on the surface of the photoconductor drum 31 by latent-image forming light emitted from the exposure device LH. The electrostatic latent image formed on the photoconductor drum 31 is developed into a toner image by the developing roller 42.

The transfer device 50 includes an intermediate transfer belt 51 and first transfer rollers 52(K), 52(C), 52(M), and 52(Y). The toner images of the respective colors formed on the photoconductor drums 31 of the photoconductor units 30 are transferred onto the intermediate transfer belt 51 in a superposed manner. The first transfer rollers 52(K), 52(C), 52(M), and 52(Y) successively transfer the toner images of the respective colors formed in the photoconductor units 30 onto the intermediate transfer belt 51 (first transfer process). The transfer device 50 also includes a second transfer roller 53 and an intermediate-transfer-belt cleaner 54. The second transfer roller 53 simultaneously transfers the toner images of the respective colors that have been transferred onto the intermediate transfer belt 51 in a superposed manner onto a sheet P, which is a recording medium (second transfer process). The intermediate-transfer-belt cleaner 54 removes toner that remains on the intermediate transfer belt 51.

The toner images of the respective colors formed on the photoconductor drums 31 of the photoconductor units 30 are successively electrostatically transferred onto the intermediate transfer belt 51 by the first transfer rollers 52(K), 52(C), 52(M), and 52(Y), which receive a predetermined transfer voltage from, for example, the power supply device 14 controlled by the image-forming-apparatus controller 11 (first transfer process). Thus, a superposed toner image in which the toner images of the respective colors are superposed is formed.

The intermediate transfer belt 51 is moved so that the superposed toner image on the intermediate transfer belt 51 is transported to the region in which the second transfer roller 53 is disposed (second transfer region TR). The sheet feeding device 20 supplies a sheet P to the second transfer region TR at the time when the superposed toner image reaches the second transfer region TR. The second transfer roller 53 receives a predetermined transfer voltage from, for example, the power supply device 14 controlled by the image-forming-apparatus controller 11, so that the superposed toner image on the intermediate transfer belt 51 is transferred onto the sheet P fed from the pair of registration rollers 24 and guided by a transport guide.

The toner that remains on the surface of each photoconductor drum 31 is removed by the cleaning blade 35 and collected in a waste toner container (not shown). Then, the surface of the photoconductor drum 31 is charged again by the charging roller 33. Substances that have not been removed by the cleaning blade 35 and adhered to the charging roller 33 are caught on the surface of the cleaning roller 34 that rotates while being in contact with the charging roller 33, and are accumulated.

The fixing device 60 includes a heating module 61 and a pressing module 62, and a fixing nip region FN (fixing region) is formed in a region in which the heating module 61 and the pressing module 62 are pressed against each other.

The sheet P onto which the toner image has been transferred by the transfer device 50 is transported to the fixing device 60 along the transport guide in a state such that the toner image is not fixed. The sheet P transported to the fixing device 60 is pressed and heated by the pair of modules, which are the heating module 61 and the pressing module 62, so that the toner image is fixed to the sheet P.

The sheet P to which the toner image is fixed is output from a pair of output rollers 69 to the paper output tray 1a on the top surface of the image forming apparatus 1.

2. Driving-Force Transmitting Device

Figure 2A:
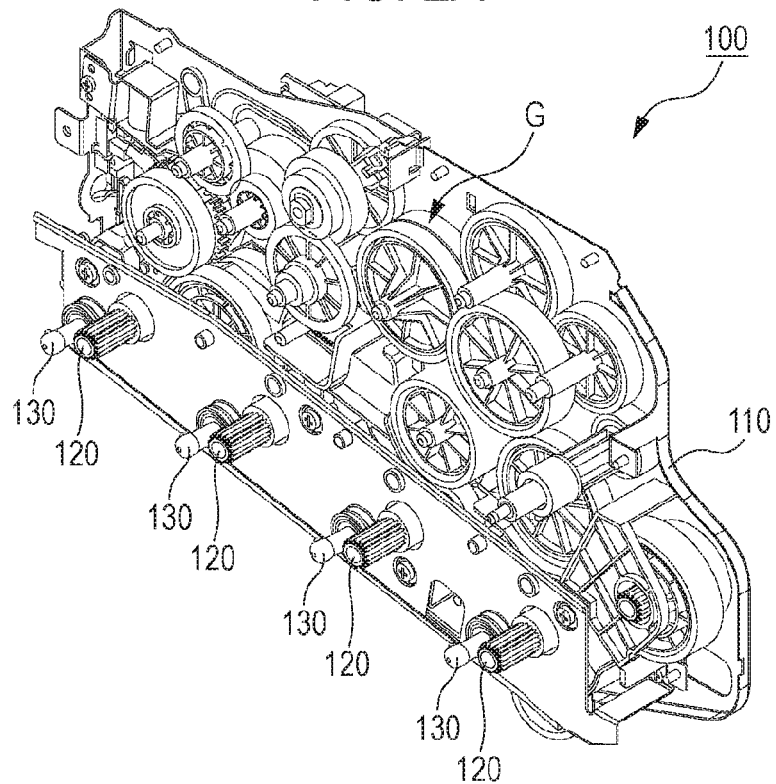
FIG. 2A is a perspective view of a driving-force transmitting device viewed from a driving-force transmission side.
Figure 2B:
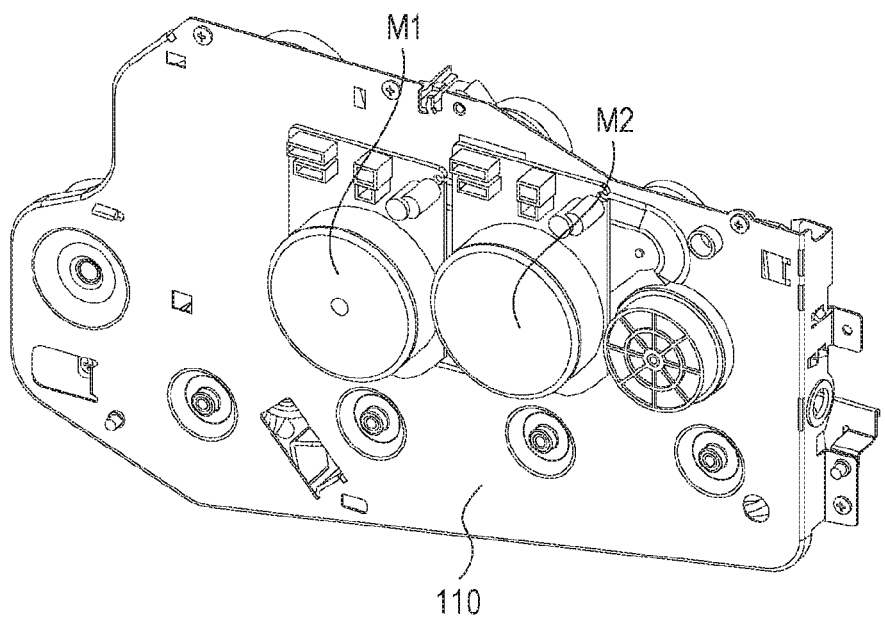
FIG. 2B is a perspective view of the driving-force transmitting device viewed from a driving-source side.
Figure 3:
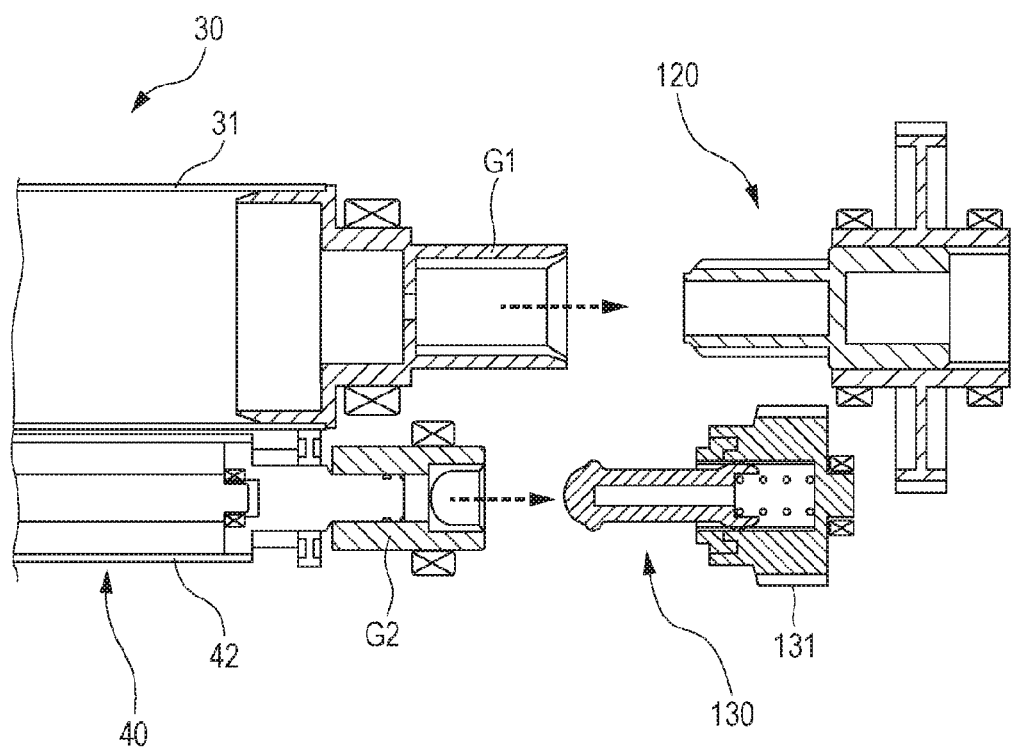
FIG. 3 is a schematic sectional view illustrating how a photoconductor unit and a developing device are attached.
Figure 4A:
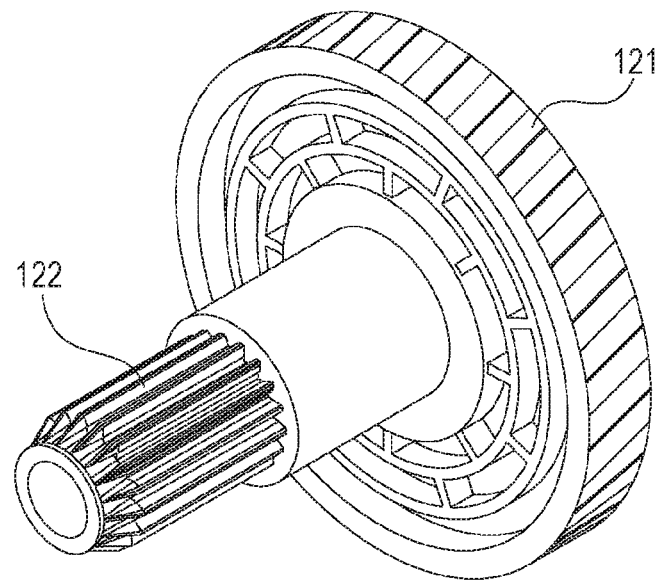
FIGS. 4A and 4B are perspective views of an external gear and an internal gear, respectively, which form a pair of involute spline joints.
Figure 4B:
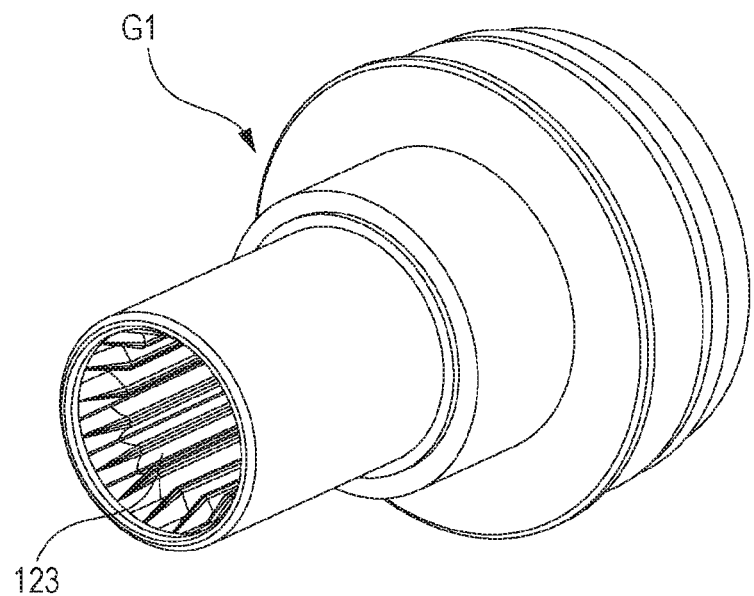
Figure 5:
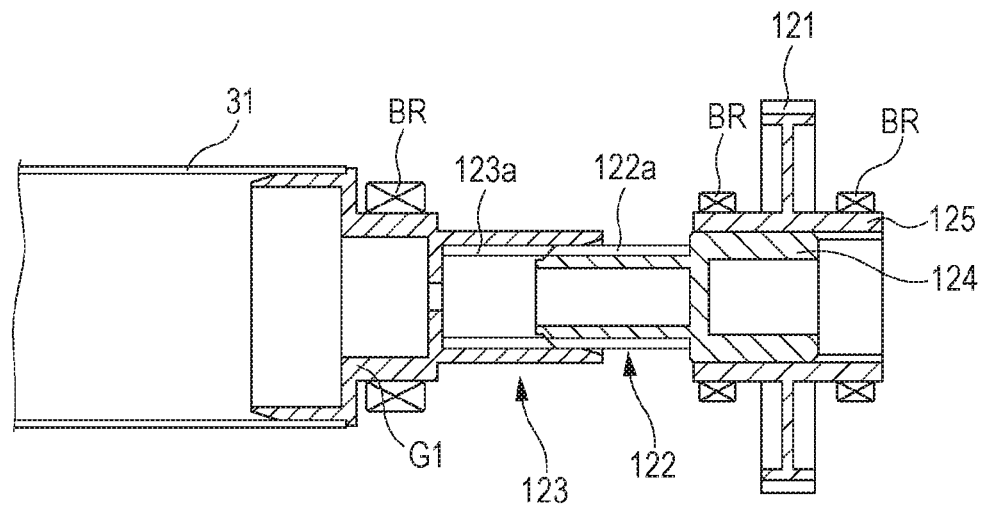
FIG. 5 is a sectional view illustrating the rotational-driving-force transmission between a first driving-side joint portion and a photoconductor drum.
Figure 6A:
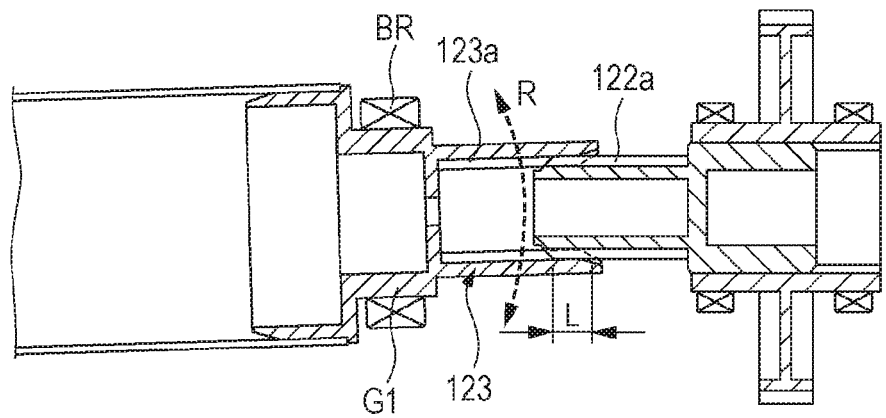
FIGS. 6A and 6B are schematic sectional views illustrating an alignment function of the first driving-side joint portion.
Figure 6B:
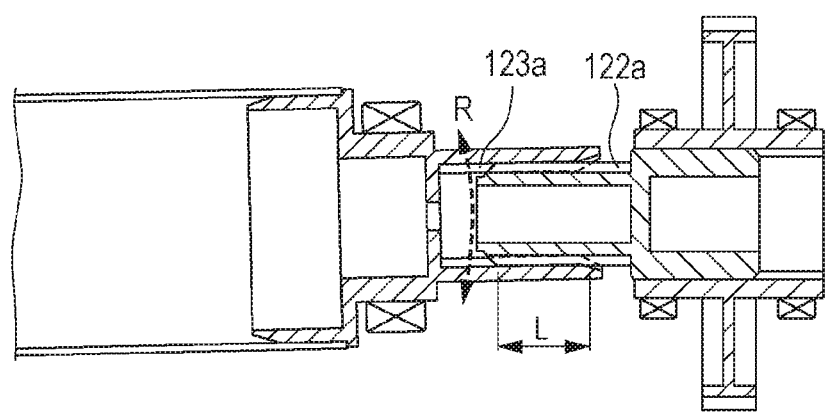
Figure 7A:
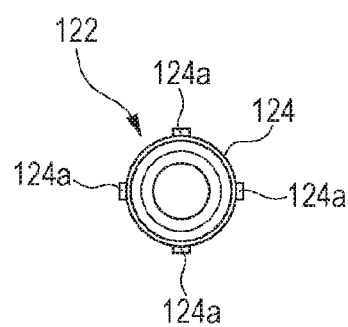
FIGS. 7A to 7C are schematic sectional views illustrating a fitting structure in which the external gear is fitted to a first output gear.
Figure 7B:
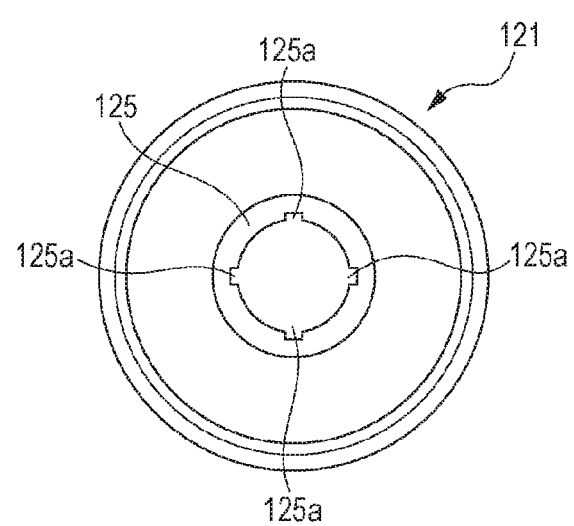
Figure 7C:
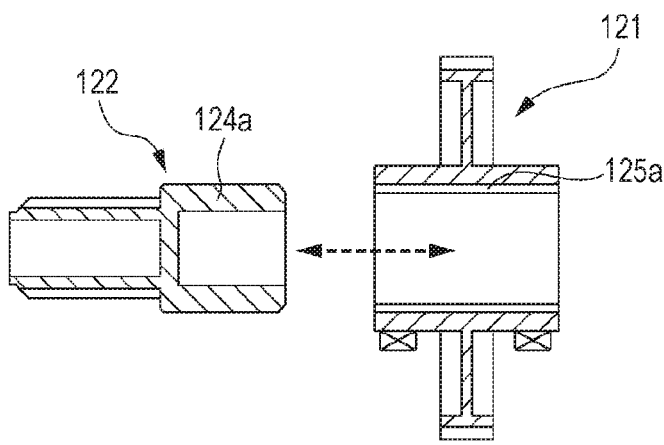
Figure 8C:
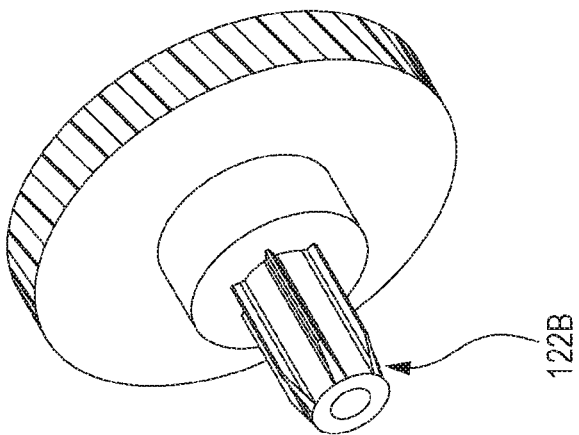
FIGS. 8A to 8C are perspective views of first driving-side joint portions including external gears having different numbers of teeth.
Figure 8B:
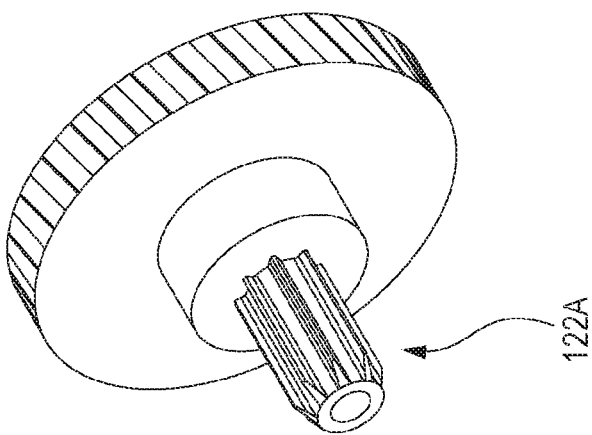
Figure 8A:
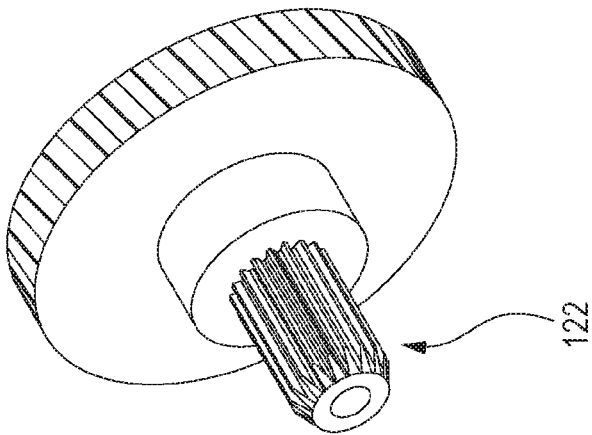

FIG. 2A is a perspective view of the driving-force transmitting device 100 viewed from a driving-force transmission side, and FIG. 2B is a perspective view of the driving-force transmitting device 100 viewed from a driving-source side. FIG. 3 is a schematic sectional view illustrating how the photoconductor unit 30 and the developing device 40 are attached. FIGS. 4A and 4B are perspective views of an external gear 122 and an internal gear 123, respectively, which form a pair of involute spline joints. FIG. 5 is a sectional view illustrating the rotational-driving-force transmission between a first driving-side joint portion 120 and the photoconductor drum 31. FIGS. 6A and 6B are schematic sectional views illustrating an alignment function of the first driving-side joint portion 120. FIGS. 7A to 7C are schematic sectional views illustrating a fitting structure in which the external gear 122 is fitted to a first output gear 121. FIGS. 8A to 8C are perspective views of first driving-side joint portions 120 including external gears 122 having different numbers of teeth. FIG. 9 is a table showing the torsional rigidities of the external gears 122.

The structure of the driving-force transmitting device 100 will now be described below with reference to the drawings.

2.1. Overall Structure of Driving-Force Transmitting Device

The driving-force transmitting device 100 includes a frame 110, plural gears G that transmit rotational driving forces of driving motors M1 and M2, and first and second driving-side joint portions 120 and 130 that transmit the rotation of the gears G to rotatable bodies.

As illustrated in FIG. 3, the photoconductor unit 30 and the developing device 40 are inserted into the apparatus body along guide rails (not shown) from the front side of the apparatus body, and are connected to the driving-force transmitting device 100 so as to receive the rotational driving forces from the driving-force transmitting device 100.

As illustrated in FIG. 2A, plural first driving-side joint portions 120 and plural second driving-side joint portions 130 are supported such that the first and second driving-side joint portions 120 and 130 project from the frame 110 at the driving-force transmission side of the driving-force transmitting device 100.

Referring to FIG. 2B, each first driving-side joint portion 120 transmits a rotational driving force of the driving motor M1, which is an example of a driving source, to the corresponding photoconductor drum 31, which is an example of a rotatable body, and each second driving-side joint portion 130 transmits a rotational driving force of the driving motor M2 to the corresponding developing roller 42, which is also an example of a rotatable body.

Each second driving-side joint portion 130 forms a ball joint mechanism that connects a second output gear 131, which is driven by the driving source through plural gears, to a developing roller gear G2 fixed to the corresponding developing roller 42. The second driving-side joint portion 130 smoothly transmits the rotational driving force to the developing roller 42, which is installed in the apparatus body and rotates while being in contact with the photoconductor drum 31.

2.2. First Driving-Side Joint Portion

As illustrated in FIG. 4A, the first driving-side joint portion 120 includes the first output gear 121, which is driven by the driving motor M1 through the gears G, and the external gear 122 that coaxially projects from the first output gear 121 and that is replaceable.

The external gear 122 meshes with the internal gear 123 shown in FIG. 4B that is formed in a central portion of a flange gear G1, which serves as a receiving-side joint portion. The flange gear G1 is coaxially fixed to the photoconductor drum 31, which serves as a rotatable body, at one end of the photoconductor drum 31. The external gear 122 transmits the rotational driving force of the driving motor M1 to the photoconductor drum 31.

As illustrated in FIG. 5, involute spline teeth 122a are formed on the outer periphery of the external gear 122. The involute spline teeth 122a mesh with involute spline teeth 123a formed on the inner periphery of the internal gear 123 of the flange gear G1, thereby forming an involute spline coupling.

The involute spline teeth 122a and the involute spline teeth 123a, which mesh with each other, have shapes similar to those of spur gears, and have a module of 0.8 and a pressure angle of 20 degrees in the present exemplary embodiment.

Since the involute spline coupling includes meshing portions having a high rigidity and has high aligning performance, even when the axis of the flange gear G1 and the axis of the first output gear 121 are misaligned when the photoconductor unit 30 is installed in the apparatus body, the misalignment may be absorbed and the rotational driving force may be transmitted.

FIGS. 6A and 6B illustrate the alignment function of the first driving-side joint portion 120. The first driving-side joint portion 120, which forms the involute spline coupling together with the internal gear 123 of the flange gear G1 that is coaxially fixed to the photoconductor drum 31, has a backlash (see arrow R in FIGS. 6A and 6B) in accordance with the meshing length (L in FIGS. 6A and 6B) between the involute spline teeth 122a of the external gear 122 and the involute spline teeth 123a of the internal gear 123 of the flange gear G1.

Accordingly, even when the axis of the flange gear G1 and the axis of the first driving-side joint portion 120 are misaligned, the misalignment may be smoothly absorbed and the rotational driving force may be transmitted.

The amount of backlash may be adjusted by appropriately setting the transfer coefficient between the involute spline teeth 122a and the involute spline teeth 123a.

As a result, even when the meshing length of the involute spline teeth 122a of the external gear 122 and the involute spline teeth 123a of the internal gear 123 of the flange gear G1 is increased, the misalignment may be absorbed by increasing the backlash, and the rotational driving force may be transmitted.

In the first driving-side joint portion 120 included in the involute spline coupling, the external gear 122 provided on the first output gear 121 is replaceable.

More specifically, as illustrated in FIG. 7A, a cylindrical portion 124, which is coaxially fitted to a hub portion 125 of the first output gear 121 at the proximal end of the external gear 122, are provided with engagement projections 124a that are arranged on the outer periphery of the cylindrical portion 124 evenly in the circumferential direction. The engagement projections 124a have a trapezoidal shape in cross section perpendicular to the axial direction, and are capable of transmitting torque in the rotation direction. The cylindrical portion 124 may be inserted into and pulled out from the hub portion 125 of the first output gear 121, thereby allowing the external gear 122 to be replaced.

As illustrated in FIG. 7B, the hub portion 125 of the first output gear 121 includes, at the inner periphery thereof, an inner surface that is coaxial with the external gear 122 and to which the outer peripheral surface of the cylindrical portion 124 is fitted and recessed grooves 125a that correspond to the engagement projections 124a.

Accordingly, as shown by the arrow in FIG. 7C, the external gear 122 of the first driving-side joint portion 120 may be inserted into and pulled out of the first output gear 121, so that the first driving-side joint portion 120 constitutes a replaceable involute spline coupling.

As illustrated in FIGS. 8A, 8B, and 8C, plural types of replaceable first driving-side joint portions 120 are prepared beforehand in accordance with the resonance frequencies of driving-force transmission systems. The first driving-side joint portions 120 include external gears 122 that have different numbers of involute spline teeth 122a and that are formed by removing N teeth (N is an integer of 1 or more) from external gears having the same number of teeth, the N teeth being evenly arranged in the circumferential direction. The external gears 122 may be selectively attached to the first output gear 121 of the driving-force transmitting device 100 depending on, for example, the rotational speed of the photoconductor drum 31 (hereinafter referred to as a process speed Vp), which is set for each print speed of the apparatus body.

The image forming apparatus 1 is structured such that the print speed thereof may be set to plural speeds by rotating rotatable bodies of the photoconductor units 30, the developing devices 40, the transfer device 50, and the fixing device 60, which are included in the common image forming unit, at plural process speeds Vp.

In the image forming apparatus 1 according to the present exemplary embodiment, when the rotatable bodies included in the image forming unit have different rotational frequencies depending on the process speed Vp, the torsional rigidities of the driving-force transmission systems are changed so that the driving-force transmission systems do not have the same resonance frequency.

The torsional rigidity [N·m/rad] of the external gear 122 including the involute spline teeth 122a vary depending on the number of teeth. FIG. 9 shows an example of the torsional rigidity.

More specifically, when the material of the external gear 122 is polyacetal (POM) having a Young's modulus of 3000 Mpa, the external gear 122 illustrated in FIG. 8A, which has a module of 0.8 and whose number of teeth is 18, has a torsional rigidity of 54.4 [N·m/rad]. The external gear 122A illustrated in FIG. 8B, which has a module of 0.8 and whose number of teeth is 9, has a torsional rigidity of 42.1 [N·m/rad], the external gear 122A being obtained by removing every other involute spline tooth 122a from the external gear 122 illustrated in FIG. 8A, which has a module of 0.8 and whose number of teeth is 18, along the circumferential direction. The external gear 122B illustrated in FIG. 8C, which has a module of 0.8 and whose number of teeth is 6, has a torsional rigidity of 36.4 [N·m/rad], the external gear 122B being obtained by evenly removing pairs of involute spline teeth 122a from the external gear 122 illustrated in FIG. 8A, which has a module of 0.8 and whose number of teeth is 18, along the circumferential direction.

By using the first driving-side joint portions 120 including the external gears 122, 122A, and 122B having different torsional rigidities, the resonance frequencies of the driving-force transmission systems may be changed in accordance with the process speed Vp of the apparatus body. Accordingly, flange gears G1 having the same structure may be used as the receiving-side joint portions of the photoconductor drums 31, which serve as rotatable bodies, and a reduction in image quality due to resonance may be suppressed.

In the present exemplary embodiment, the photoconductor drums 31 are described as an example of rotatable bodies. However, the rotatable body that receives a rotational driving force from a driving source through each first driving-side joint portion 120 may instead be a pair of transport augers 44A and 44B, which are developing screws that transport the developer to the developing roller 42 while stirring the developer, or a transfer driving roller 55 that rotates the intermediate transfer belt 51.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A driving-force transmitting device comprising:
a driving-side joint portion that couples to a receiving-side joint portion provided at an end of a rotatable body,
wherein the driving-side joint portion is configured to transmit a rotational driving force of a driving source,
wherein the driving-side joint portion and the receiving-side joint portion are a pair of involute spline joints including an external gear and an internal gear, a number of teeth of one of the gears being smaller than a number of teeth of the other gear, and
wherein the involute spline joints are configured such that the one of the gears that has the smaller number of teeth is obtained by removing N teeth, where N is an integer of 1 of more, from a gear having the same number of teeth as the number of teeth of the other gear, the N teeth being evenly arranged in the circumferential direction.

2. The driving-force transmitting device according to claim 1, wherein the driving-side joint portion is replaceable.

3. The driving-force transmitting device according to claim 1, wherein the rotatable body is any one of a photoconductor drum, a transfer drive roller, and a developing screw.

4. An image forming apparatus comprising:
a plurality of rotatable bodies, at least one of which is configured to be driven by the driving-force transmitting device according to claim 1.

5. A driving-force transmitting device comprising:
a driving-side joint portion that couples to a receiving-side joint portion provided at an end of a rotatable body,
wherein the driving-side joint portion is configured to transmit a rotational driving force of a driving source,
wherein the driving-side joint portion and the receiving-side joint portion are a pair of involute spline joints including an external gear and an internal gear, a number of teeth of one of the gears being smaller than a number of teeth of the other gear, and
wherein the number of teeth of the one of the gears that has the smaller number of teeth is set so as to decrease as a rotational speed of the rotatable body decreases.

6. The driving-force transmitting device according to claim 5, wherein the involute spline joints are configured such that the one of the gears that has the smaller number of teeth is obtained by removing N teeth, where N is an integer of 1 or more, from a gear having the same number of teeth as the number of teeth of the other gear, the N teeth being evenly arranged in the circumferential direction.

7. The driving-force transmitting device according to claim 5, wherein the driving-side joint portion is replaceable.

8. The driving-force transmitting device according to claim 5, wherein the rotatable body is any one of a photoconductor drum, a transfer drive roller, and a developing screw.

9. An image forming apparatus comprising:
a plurality of rotatable bodies, at least one of which is configured to be driven by the driving-force transmitting device according to claim 5.

* * * * *